May 24, 1938. D. B. DIMICK Re. 20,736
SUBDRAINAGE PIPE
Original Filed March 10, 1937
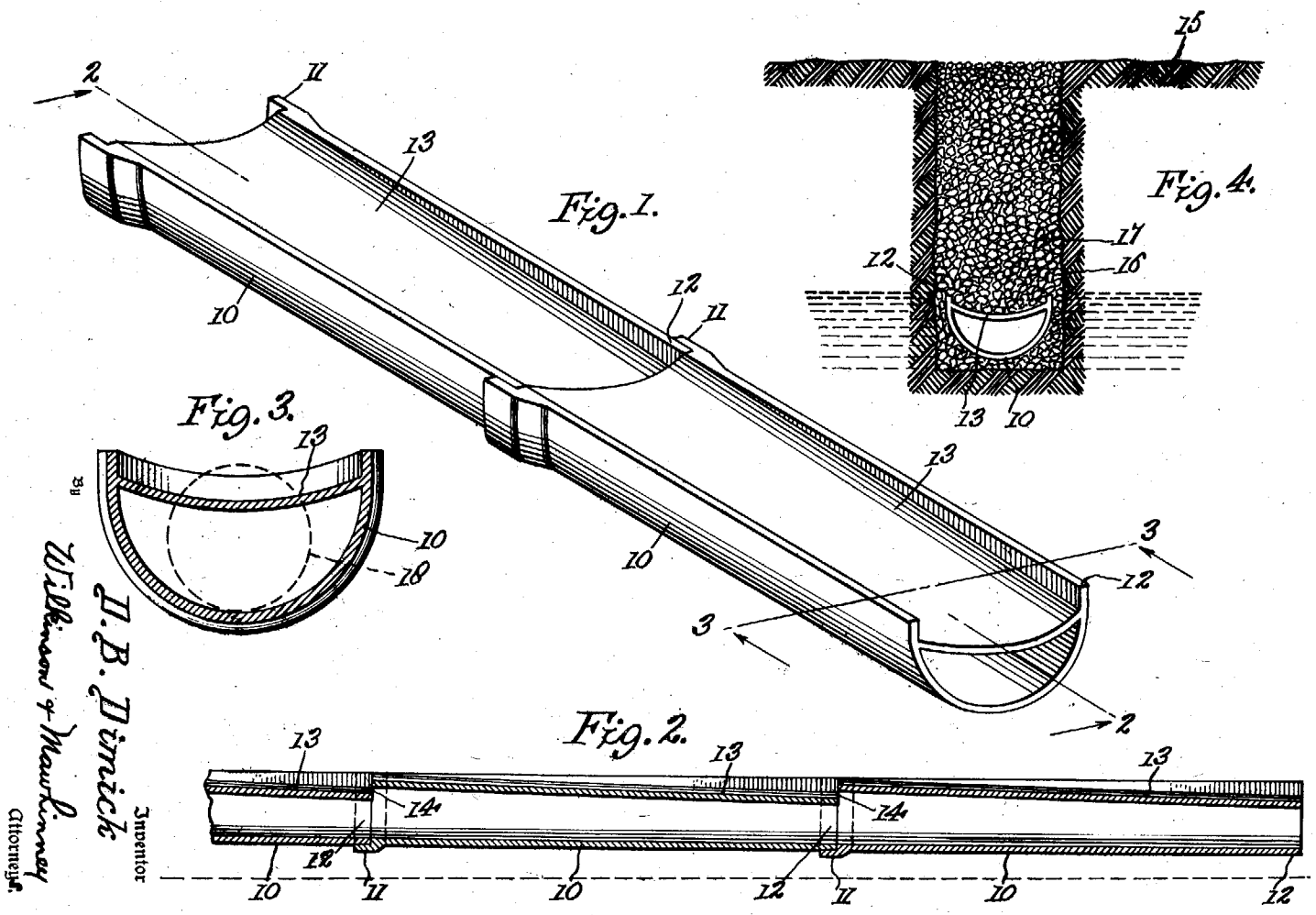
Inventor
D. B. Dimick
By
Wilkinson & Mawhinney
Attorneys.

Reissued May 24, 1938

Re. 20,736

UNITED STATES PATENT OFFICE 20,736

SUBDRAINAGE PIPE

Daniel B. Dimick, Newton Center, Mass., assignor to Dimick-Mosher Products Company, Boston, Mass., a corporation of Massachusetts Original No. 2,089,115, dated August 3, 1937, Serial No. 130,206, March 10, 1937. Application for reissue March 7, 1938, Serial No. 194,512

10 Claims. (Cl. 61—11)

The present invention relates to drainage means, and more particularly to a drainage pipe and a novel construction of pipe section to make up the drainage pipe.

An object of this invention is to provide a drainage pipe section which will efficiently and quickly carry off drainage water in various installations, such as from a large area used as an airport field, a golf course, municipal playground, baseball field, railroad freight yards and the like, as well as for use along railroad rights-of-way and in the construction of class A paved highways.

Another object of the present invention is to provide an improved construction of drainage pipe which may take the place of the now widely used steel perforated pipe which has openings in its lower side and depends upon a proper pressure head of the water before the latter enters the drainage pipe through the openings.

Another object of the present invention is to povide a drainage pipe section which is of substantially semi-cylindrical construction having its sectional edges directed upwardly and closed across its top by a closure wall providing a trough or concave cradle in the form of a web or wall which extends entirely across the upper side of the pipe section and which is inclined from one end thereof near its upper edge gradually to the opposite end of the section at a point spaced below the edge sufficiently to provide water receiving openings between the abutting ends of the pipe sections.

Another object of the present invention is to provide a drainage pipe section of the bell and spigot type which has the top trough wall thereof terminating at the top edge of the pipe section in spaced relation to the enlarged or bell portion of the section so that the trough walls of adjacent sections are displaced vertically at their adjacent ends to admit water by gravity into the bases of the pipe sections for carrying off the water by gravity when the sections are assembled in a downwardly sloping line or grade.

The invention also provides a cast iron structure which eliminates the corrosion and rusting of the steel pipes, a construction which rapidly and effectively carries off the drainage water which is fed to the drainage device by gravity and not dependent upon hydrostatic pressure, and a device which cannot easily become clogged or choked incident to the accumulation of silt or the like which is found to usually clog up and render ineffective drainage pipes and the like heretofore used.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a perspective view of a pair of drainage pipe sections assembled for use.

Figure 2 is a vertical longitudinal section taken through the same on the line 2—2 of Figure 1.

Figure 3 is an enlarged transverse section taken through one of the sections on the line 3—3 of Figure 1, and Figure 4 is a transverse section taken through a trench having the drainage pipe of this invention disposed therein.

Referring now to the drawing, there is shown in Figures 1 and 2 a drainage pipe made up of a number of sections 10 constructed according to the present invention. Each section 10 is of cast iron, or other suitable material, and is substantially semi-circular in cross-section so as to provide a hollow body of substantial width and depth to the pipe section. The semi-cylindrical section is adapted to be positioned in a trench with its lower rounded bottom or surface toward the bottom of the trench, and with this construction the pipe section may have considerable width as compared with the usual cylindrical pipes now employed, and may thus cover a greater horizontal surface area for drainage to more effectively catch the drain water and carry it off by gravity through the pipe. The pipe, comprising a plurality of the sections 10 may each have a bell 11 at one end and a spigot portion 12 at its opposite end so that the pipe sections interfit as shown in Figures 1 and 2 to provide a drainage pipe line of desired length.

Instead of perforating the lower curved wall of the pipe section 10 as is common in drainage pipes, and which are found to be a great source of annoyance in clogging and the like, the present invention provides a top wall 13 which extends between the upper edge portions of the pipe section 10 and is transversely curved on a relatively large radius to provide a trough on the top of the pipe section. This wall 13 extends from end to end of the pipe section 10 and at the same time is sloped or inclined from end to end of the pipe section. As shown in Figures 1 and 2, the higher end of the trough wall 13 initiates at the bell 11, preferably at a point spaced inwardly of the enlarged end of the bell, or flush with the internal shoulder thereof. The wall 13 inclines downwardly from the bell 11 at one end of the section to the spigot 12 at the other end of the section, the slope being a gradual slow one so as to impart gravitational movement to the drainage water settling upon the wall 13 to flow in the desired direction with respect to the pipe section.

When a plurality of the pipe sections 10 are assembled it will be observed, particularly from Figure 2, that the trough or upper surface of the wall 13 of the one section 10 is inclined downwardly toward the adjacent section and terminates in slightly spaced relation below the upper end of the next adjacent wall 13. This provides a drainage inlet opening 14 through which water collected on the upper surfaces of the walls 13 may enter the interior or body portion of the drainage pipe. As shown in Figure 2, the drainage pipe is inclined in the direction of the slope of the wall 13 so that the water which is admitted to the interior of the built up drainage pipe through the openings 14, will flow by gravity continuously and evenly toward the lower end of the drainage pipe and thus maintain the interior thereof clear and unobstructed.

The upper trough portion of the drainage pipe may be made relatively wide so that the drainage water may be readily caught and trapped in the trough wall 13 and thence carried to the drainage pipe. In this way the water is collected by gravity and no upward pressure of the water is required as is now generally necessary with present systems and drainage pipe structures, the ground will, therefore, be kept relatively dry as there will be no accumulation of entrapped water, and the ground areas thereby drained will be rapidly drained as the water is carried off quickly and efficiently from the very moment of accumulation.

It is only necessary to have the surface level of the accumulated water of a height sufficient to flow over the lateral edges of the pipe sections 10 so that the water may enter the trough wall 13. Heretofore, it has been necessary for a large body of water to accumulate with a relatively high surface level so as to obtain the necessary head or pressure of the water against the under side of the drainage pipe to force the water through the perforation in the pipe, dislodge silt and other accumulations and thus effect at least a partial flow of the water through the drainage system.

The provision and disposition of the concave upper wall 13 of the semi-cylindrical pipe section performs not only the function of reinforcing and strengthening the lateral walls of the body section 10, but also serves to accumulate a relatively large percentage of the drain water by gravity and direct the collected water to the opening 14 and thence into the interior or body of the pipe section in the direction of gravitational flow of the water in the pipe section. These features promote continued equal and efficient drainage of all water which gravitates upon the upper surface of wall 13 of the pipe section.

The drainage pipe may be laid in any suitable manner depending upon the conditions of installation, and in Figure 4 the drainage pipe is shown as installed below the ground surface 15 in a trench 16 of suitable width to accommodate the drainage pipe and which may have a bottom of the desired slope, and in which the drainage pipe is installed. Gravel 17 of other suitable material is filled into the trench 16 about and beneath the drainage pipe to the desired extent and the gravel body 17 may be of particles of various sizes to permit seepage of water downwardly in the trench 16 to the top of the drainage pipe. It will be noted that the drainage pipe is relatively wide as compared with the usual cylindrical or round pipe indicated by the broken line 18 in Figure 3 so that the drainage pipe of this invention is relatively wide or broad at its top to insure the collection of a relatively large volume of the downwardly seeping drain water for carrying the same directly off.

It is obvious that various changes and modifications may be made in the details of construction and design of the above specifically described embodiment of this invention without departing from the spirit thereof, such changes and modifications being restricted only by the scope of the following claims:

What is claimed is:

1. A drainage pipe comprising a plurality of pipe sections disposed in endwise abutting relation, each pipe section having a semi-cylindrical body portion with a transversely concave closure wall extending between the upper edge portions of the body portion, said closure wall being inclined from end to end of the pipe section with the lower end of one section adapted to terminate in spaced relation below the upper end of an adjacent section whereby to provide an inlet opening or passage of drain water accumulating on the upper walls of the sections.

2. A drainage pipe section comprising a semi-cylindrical body portion having a rounded lower wall and provided with a trough wall extending between the upper edge portions of the body portion of the section, said trough wall being inclined from end to end of the pipe section for directing drain water collected in the trough wall toward one end of the section.

3. A drainage pipe section comprising a cast iron semi-cylindrical body portion having a spigot on one end and a bell on its opposite end, said cast iron body portion having an integral top wall extending throughout substantially the length of the body portion and inclined from end to end of the body portion, said top wall being transversely concave to direct accumulated water on the top wall centrally of and toward one end of the section.

4. A drainage pipe comprising a plurality of bell and spigot sections disposed in endwise interfitting engagement, said sections being of substantially semi-cylindrical construction with their rounded surfaces lowermost and provided with top walls extending throughout the length and width of the sections between the upper edge portions thereof, said top walls being transversely concave to provide troughs for the accumulation of drainage water gravitating on the tops of the pipe sections, said top walls of the pipe sections all inclined downwardly from end to end of the sections and disposed with the lower end of a top wall of one section spaced beneath the upper end of the top wall of an adjacent section to provide an opening through which the accumulated drain water on the top wall may pass to the interior of the drainage pipe.

5. A drainage pipe section comprising a hollow body portion having a lower imperforated wall and provided with a wall crossing the top of the body portion and adapted to receive thereon water gravitating upon the drainage pipe section, said top wall of the pipe section being inclined from one end of the section toward the other to direct the drainage water over the top wall to one end of the section.

6. A drainage pipe comprising a plurality of hollow body portions having top walls adapted to receive drainage water gravitating thereon, the top walls of the sections being inclined from end to end of the sections with the lower end of the top wall of one section spaced below the upper end of an adjacent section to provide openings at the meeting ends of the sections for passage of water deposited upon the top walls of the sections to the interior of the drainage pipe.

7. A drainage pipe comprising a plurality of pipe sections, said pipe sections being substantially semi-cylindrical and having top walls displaced vertically at their adjacent ends to admit water by gravity into the pipe sections, said pipe sections being assembled in a downwardly-sloping line to carry off water by gravity.

8. A drainage pipe comprising a plurality of pipe sections disposed in endwise abutting relation, each pipe section having a semi-cylindrical body portion with a transversely-concave closure wall extending between the upper edge portions of the body portion, the closure wall of one section terminating in spaced relation below the upper end of the closure wall of an adjacent section whereby to provide an inlet opening or passage for drain water accumulating on the upper closure walls of the sections.

9. A drain pipe comprising a plurality of bell and spigot sections disposed in endwise interfitting engagement, said sections being of substantially semi-cylindrical construction with their rounded surfaces lowermost and provided with top walls extending substantially throughout the length and width of the sections between the upper edge portions thereof, said top walls being transversely concave to provide troughs for the accumulation of drainage water gravitating on the tops of the pipe sections, said top walls of the pipe sections being disposed with the end of a top wall of one section spaced beneath the adjacent end of the top wall of an adjacent section to provide an opening through which the accumulated drain water on the top wall may pass to the interior of the drainage pipe.

10. A drainage pipe, composed of a plurality of pipe sections laid on an inclination for gravitational movement of the drain water, said sections being substantially semi-cylindrical and having top closure walls to receive the drain water, the top walls of adjacent sections being spaced apart at the near ends thereof to afford passage for the movement of the drain water from the top walls into the interior of the drain pipe.

DANIEL B. DIMICK.